(12) United States Patent
Czado

(10) Patent No.: US 7,070,836 B2
(45) Date of Patent: Jul. 4, 2006

(54) FILTER MATERIALS COMPRISING A BIPOLAR COATING

(75) Inventor: Wolfgang Czado, Gefrees (DE)

(73) Assignee: Helsa-Automotive GmbH & Co. KG, Gefrees (DE)

( * ) Notice: Subject to any disclaimer, the term of this patent is extended or adjusted under 35 U.S.C. 154(b) by 176 days.

(21) Appl. No.: 10/468,390

(22) PCT Filed: Feb. 12, 2002

(86) PCT No.: PCT/DE02/00492

§ 371 (c)(1),
(2), (4) Date: Aug. 19, 2003

(87) PCT Pub. No.: WO02/068734

PCT Pub. Date: Sep. 6, 2002

(65) Prior Publication Data
US 2004/0080083 A1 Apr. 29, 2004

(30) Foreign Application Priority Data
Feb. 28, 2001 (DE) ............................... 101 09 474

(51) Int. Cl.
*B05D 1/04* (2006.01)

(52) U.S. Cl. ...................... 427/462; 427/465; 427/471

(58) Field of Classification Search ................ 427/457, 427/458, 471, 475, 477, 479, 482–486, 462, 427/465
See application file for complete search history.

(56) References Cited

U.S. PATENT DOCUMENTS

| 3,380,845 | A | * | 4/1968 | Shapiro et al. ............. 427/471 |
| 4,144,553 | A | | 3/1979 | Schmidt et al. |
| 4,230,650 | A | * | 10/1980 | Guignard ................... 264/441 |
| 2002/0071944 | A1 | * | 6/2002 | Gardner et al. ............ 428/198 |

FOREIGN PATENT DOCUMENTS

| DE | 1087429 | 10/1967 |
| DE | 2328015 | 12/1974 |
| EP | 1 048 335 | 4/2000 |

* cited by examiner

*Primary Examiner*—Fred J. Parker
(74) *Attorney, Agent, or Firm*—Jan K. Simpson; Fulbright & Jaworski LLP

(57) ABSTRACT

The inventions directed to a process for producing non-woven fabric materials in which nano- and/or microfibers are produced by an electrostatic spinning process from a polymer melt or a polymer solution and deposited to form a non-woven fabric. A carrier material in web form is arranged or is passed through between at least two spraying devices which are in the form of electrodes for producing an electrical field and each side of the carrier material is coated with the nano- and/or microfibers of opposite polarity, which are produced by means of the spraying devices.

14 Claims, 1 Drawing Sheet

FILTER MATERIALS COMPRISING A BIPOLAR COATING

TECHNICAL FIELD

Figure 1:
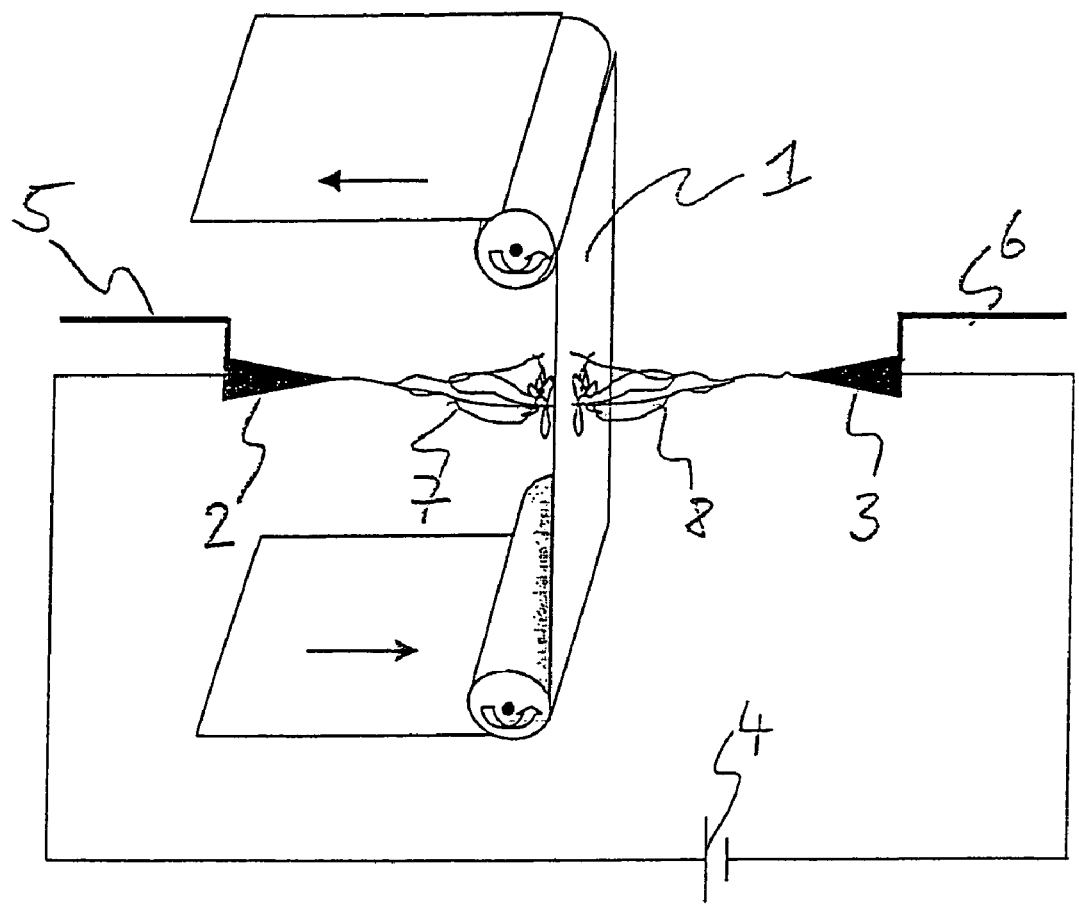

The present invention concerns a process for producing non-woven fabric materials in which nano- and/or microfibers are produced by an electrostatic spinning process from a polymer melt or a polymer solution and deposited to form a non-woven fabric.

BACKGROUND OF THE INVENTION

In a process of that kind which is basically known a polymer in the form of a polymer melt or in the form of a solution is introduced into an electrical field and spun to form fibers by virtue of the action of an electrical field. In that procedure an electrode usually forms a receiving device for the spun fibers while the counterpart electrode is frequently in the form of a spray nozzle. The last-mentioned electrode can however also be in the form of a heatable conveyor belt which can be charged up at a given potential, for converting solid polymers into a molten material and for spinning fibres from that molten material.

As an example of a process for the production of a corresponding fiber product from a polymer melt, reference may be made for example to U.S. Pat. No. 4,230,650.

A particularly preferred area of use of non-woven fabric materials is use as filter media. In the production of such filter media the nano- and/or microfibers which are produced using an electrostatic spinning process are generally not deposited in isolation but directly as a non-woven fabric or fleece.

A process of that kind is known for example from U.S. Pat. No. 4,144,553. In addition there are a large number of proposals for improving electrostatic spinning processes, which concern an improvement in the electrodes and the electrode geometry as well as the compositions of the polymer melts and/or polymer solutions used. It was possible in that way in particular to influence fiber thickness, fiber thickness distribution and the length of the nano- and/or microfibers produced, as well as the structure of the non-woven fabric produced.

The usual electrostatic spinning processes, for deposit of the fibers, generally involve using a counterpart electrode made of metal, over which a textile carrier material is mostly passed, with the nano- and/or microfibers being deposited on the carrier material to constitute a non-woven fabric. The charge is partially removed from the deposited fibers. That is certainly desirable in relation to some uses, for example as filters. On the other hand the residual charge of the fibers which have already been deposited prevents the further deposit of fibers which are charged in the same direction. That means that the total charge of the non-woven fabric is limited by the electrical voltage at the counterpart electrode and at best the procedure involves continuous charge removal in the operation of depositing further fibers.

That has the disadvantage of limiting the filter action which can be achieved as, besides the screening effect of the fine fibers, that filter action is largely based on electrostatic separation of particles at the fibers. The electrostatic charge is fixed in a certain manner in the spun nano- and/or microfibers while the counter-charge can flow away to the charged fibers by way of the non-woven carrier material and at the fibers can neutralise the charge thereof.

Those limitations as a matter of principle can be only partly circumvented by the subsequent separation of oppositely charged fibers, as described in DE 20 320 72 A. The problem still persists that separation takes place only as long as the attracting voltage of the counterpart electrode overcomes or exceeds the repelling voltage of the deposited fibers.

Therefore the object of the present invention is to provide an improved electrostatic spinning process for the production of non-woven fabric materials, in which nano- and/or microfibers are produced from a polymer melt and are deposited to form a non-woven fabric. In particular the object of the invention is to at least partially overcome the disadvantages known from the state of the art, and to provide a process with which it is possible to obtain non-woven fabric materials with properties which are advantageous in particular for filter purposes.

BRIEF SUMMARY OF THE INVENTION

In accordance with the invention, a carrier material in web form is arranged between at least two spraying devices which are in the form of electrodes for producing an electrical field, wherein simultaneous coating of each side of the carrier material is effected with the nano- and/or microfibers of opposite polarities which are produced by means of the spraying devices. In that procedure the carrier material in web form can be arranged stationarily between the electrodes which are in the form of spraying devices and between which the electrical field is produced, or the carrier material can be moved through between those electrodes. Particularly in the case of the variant which has just been referred to above, there is advantageously the possibility of producing bipolar non-woven fabric materials of infinite length. The width depends basically on the demands involved and can vary from a few centimeters to several meters.

The simultaneous coating of both sides of the carrier material with nano- and/or microfibers of opposite polarity advantageously affords a more effective filter material which has a higher level of charge density and in which both the positive and also the negative charge is firmly fixed in the fibers.

In a particularly advantageous configuration of the present invention the throughput rate of the polymer melt and/or polymer solution sprayed by spray devices is increased at least for a part of the spinning procedure so that at least a part of the polymer melt and/or the polymer solution is deposited in the form of drops on the carrier material. In that respect it was surprisingly found that drops produced in that way remain fluid until they impinge on the carrier material or fibers which have already been deposited and remain clinging there by virtue of their adhesion force and subsequently solidify by virtue of cooling or evaporation of the solvent. That makes it possible to achieve a further increase in the charge density in the non-woven fabric to be produced without adversely influencing the flow resistance of the filter.

A further particular advantage of the process according to the invention in that respect is that not just different polymers with a different charge can be sprayed and applied to the carrier material by the at least two spraying devices which are in the form of electrodes. It is quite possible for a polymer melt to be processed in one spraying device and for a polymer solution to be processed at the same time in another device. That affords a particular option of variation in the structure of the non-woven fabric to be produced so that it is possible in that way to satisfy the most widely varying demands.

In a development of the above-described embodiment the throughput rate of the polymer melt and/or polymer solution sprayed by the spraying devices is periodically increased and reduced again. In that way it is possible for nano- and/or microfibers and 'polymer drops or beads' to be arranged in relatively uniformly distributed relationship in the non-woven fabric to be produced.

The carrier material used, in web form, is preferably formed by a laid, knitted or hosiery material or a non-woven fabric. In that respect the choice of the carrier material involved depends on the requirements to be satisfied in terms of stretch properties and for example the air resistance which is of particular significance in use as a filter material. The man skilled in the art will make an appropriate choice here.

It is particularly preferred if the carrier material involves polymer unity in regard to at least one of the polymers employed as the polymer melt and/or in the polymer solution, as recycling is greatly simplified as a result and, in production of the end product from constituents which exclusively involve polymer unity, can be effected without separation of differing constituents or non-woven fabric layers.

A further particular embodiment of the process according to the invention provides that at least one charge-stabilising substance or compound is added to the polymer solution and/or the polymer melt prior to the spinning operation. Particular examples that are to be mentioned are metal powder, carbon and/or graphite powder, dyestuffs, metallocenes, amines, electrically conductive polymers and ceramics, in each case individually or as a combination of at least two of the above-mentioned substances. In addition the charge-stabilising substance or compound can be selected from the halogens, fluorine, chlorine, bromine, iodine and a compound thereof with each other, halogen oxides such as for example $Cl_2O$, the hydrogen halides, hydrogen fluoride, hydrogen chloride, hydrogen bromide and hydrogen iodide which are present pure or in the form of an aqueous solution, the inert gas halides, nitrogen oxides such as for example nitrogen monoxide, dinitrogen monoxide and nitrogen dioxide, the sulfur oxides, sulfur monoxide and sulfur dioxide and sulfur trioxide and sulfur hexafluoride, wherein those substances can also be used individually or as a combination of at least two of the above-mentioned substances with each other and/or in combination with the previously specified substances. For the sake of completeness mention should also be made of ammonia, inert gases, hydrogen, hydrogen sulfide, carbon monoxide, carbon dioxide and water and all substances which can decompose to form the above-mentioned substances or liberate same by decomposition or reaction, such as for example $NCl_3$, $NBr_3$, $NI_3$, $NOCl$, $NOBr$, $PCl_3$, $PBr_3$, $PI_3$, $PCl_5$, $PBr_5$, $SCl_2$, $S_2Cl_2$, $SCl_4$, halides, oxohalides and sulfur halides of boron, silicon, germanium, tin, lead, nitrogen, phosphorus, arsenic, antimony, bismuth, sulfur, selenium and tellurium as well as halides and oxohalides of the transition elements such as for example titanium, palladium, chromium and the like.

That charge-stabilising substance or compound or that mixture of charge-stabilising substances or compounds are preferably used in accordance with the invention in a range of between 0.01 and 20% by weight with respect to the polymer melt or polymer solution.

The particular advantage when using those substances is that they function as charge carriers or charge stabilisers which are enclosed in the spinning operation by a polymer case, thereby permitting their charge to be maintained for months. That also contributes not inconsiderably for example to the storability of the filter materials produced. In connection with the present invention particular emphasis is to be placed on the fact that it is possible to obtain non-woven fabric materials with a particularly wide range of uses because a large number of different polymers can be processed in the processes according to the invention. That not only makes it possible to produce non-woven fabrics or filter materials which are constructed with polymer unity, which expressly also embraces the simultaneous use of similar polymers involving different molecular weights, but also the use of different polymers. As those polymers can be combined in practically any desired fashion, it is possible for the man skilled in the art to produce non-woven fabric materials or filter materials which are matched to each individual situation of use. Of the polymer melts and/or polymer solutions which can be basically used in the process according to the invention, particular mention is to be made of aqueous solutions of polyvinylalcohol, polyvinyl pyrrolidine, polyethylene oxide and copolymers thereof, cellulose derivatives, starch and mixtures of said polymers and/or, dissolved in organic solvents, polystyrene, polycarbonate, polyvinylchloride, polyacrylate, polyurethane, polyamide, polysulfone, polyether sulfone, cellulose derivatives and mixtures of said polymers as a polymer solution and/or thermoplastic materials such as polyolefins, polyesters, polyoxymethylene, polychlorotrifluoromethylene, polyphenylene sulfide, polyaryletherketone, polyvinylidene fluoride as well as mixtures of said polymers in a melt for the production of the nano- and/or microfibers.

In a preferred development of the process according to the invention furthermore in each case two oppositely charged layers of nano- and/or microfibers are simultaneously deposited and that operation is repeated at least once with in each case identical or different polymer solutions and/or polymer melts. That makes it possible to obtain multi-layer non-woven fabric materials or filter materials which further enhance the variation options and thus the adaptability to specified areas of use. It is particularly preferred in that respect for the polarity of the electrical field to be reversed upon a repetition of the fiber deposit operation as that affords a non-woven fabric material with a layer structure whose polarities alternate. That permits a particular increase in for example filter efficiency.

Depending on the respective area of use of the non-woven fabric materials produced with the process according to the invention, one or both sides thereof is or are exposed to particular mechanical effects. In that respect the man skilled in the art is familiar with the notion that for example in the case of use as a vacuum cleaner filter operating personnel who are technically untrained and who operate in an unskilled manner frequently give rise to loadings and stresses which do not occur in use as a cabin air filter, circulatory air filter, clean room filter or exhaust air filter in many cases as those filters are used or replaced only by especially trained personnel. Corresponding loadings can also occur in the case of living space filters. In addition certain mechanical loadings and stresses can be caused by inappropriate packaging or storage or transportation. In order to avoid disadvantageous effects on the product, that is to say the non-woven fabric material, it is provided that at least one of the layers of nano- and/or microfibers which are deposited on the carrier material is provided with a covering comprising a laid material, a knitted material, a hosiery material and/or a non-woven fabric material. In that respect it is to be borne in mind that this additional layer as far as possible should not have a detrimental effect on air resistance, but at the same time is securely fixed. The above-mentioned covering is therefore preferably fixed by lamination, glueing or needling on at least one side of the non-woven fabric material.

DETAIL DESCRIPTION OF THE DRAWINGS

The present invention is described in greater detail hereinafter with reference to the accompanying Figure and by means of Examples, wherein this description serves exclusively for better understanding of the invention and in no way for limiting same.

FIG. 1 is perspective view of a carrier material in the form of a web arranged between two spraying devices.

DETAILED DESCRIPTION OF THE INVENTION

It can be seen from FIG. 1 that a carrier material 1 in the form of a web is arranged between two spraying devices 2, 3 in the form of electrodes for producing an electrical field. The spraying devices 2, 3 are connected to a high-voltage generator 4 for producing the electrical field. The spraying devices 2, 3 are also each connected to devices 5, 6 for the feed of material, which serve to feed a polymer melt and/or a polymer solution.

In operation in that case nano- and/or microfibers 7, 8 are produced by the spraying devices and deposited on the carrier material 1. In this case the nano- and/or microfibers produced are of opposite polarity and possibly contain charge-stabilising additives so that it is possible to obtain a non-woven fabric material involving a bipolar structure.

In the embodiment of the present invention, as shown in FIG. 1, the carrier material 1 is a roll or endless material which is passed through between the spraying devices 2, 3 during the operation of depositing the nano- and/or microfibers 7, 8. It will be appreciated that it is possible for further spraying devices to be provided and arranged, besides the illustrated two spraying devices. It will also be seen from FIG. 1 that a multi-layer structure for the non-woven fabric material to be produced is easily possible by using as the carrier material a material which has already once been coated in accordance with the process of the invention.

EXAMPLE 1

A 5% polystyrene solution in dichloromethane is mixed with 0.5 g/l of Rhodamin G6 and spun at a flow rate of 0.3 ml of polymer solution/min./spraying device. The spraying devices are disposed at a spacing of 25 cm in directly opposite relationship and the carrier non-woven fabric material (Micro-Spunbond polypropylene non-woven fabric material weighing 60 g/m$^2$) is passed through at the center at a speed of 0.5 m/min. A high voltage of + and −15 KV respectively is applied to the spraying devices. The K60 material coated in that way has a deposit rate of 68% of the 0.3–0.5 μm fraction of NACl. That was measured at a flow speed of 50 l/min and with an afflux surface area of 100 cm$^2$. The air resistance of the carrier non-woven fabric was only increased from 8 to 12 Pa under those conditions by the coating.

COMPARATIVE EXAMPLE 1

With a non-woven fabric which is produced in accordance with the state of the art by coating on a metal electrode under manufacturing conditions which are otherwise the same, the deposit rate achieved is 58%, with the air resistance being markedly increased to 19 Pa. If in accordance with DE 20 320 72 A the non-woven fabric is firstly coated with positively charged fibers and then with negative ones, the deposit rate is only 37% at 17 Pa.

With a non-woven fabric which is produced in accordance with the state of the art by coating on a metal electrode with a 5% polystyrene solution without additives under manufacturing conditions which are otherwise the same, only 19% is deposited at an air resistance of 7 Pa.

EXAMPLE 2

A 5% polystyrene solution in dichloromethane is mixed with 20 g/l of graphite dust with a particle diameter of 50 μm and spun at a flow rate of 0.3 ml/min./spraying device. The spraying devices are disposed at a spacing of 25 cm in directly opposite relationship and the carrier non-woven fabric material (Micro-Spunbond polypropylene non-woven fabric material weighing 60 g/m$^2$) is passed through at the center at a speed of 0.5 m/min. A high voltage of + and −15 KV respectively is applied to the spraying devices. The K50 material coated in that way has a deposit rate of 58% of the 0.3–0.5 μm fraction of NACl at a flow speed of 50 l/min, with an air resistance of 12 Pa and with an afflux surface area of 100 cm$^2$.

EXAMPLE 3

A 5% polystyrene solution in dichloromethane is spun with 5 g/l of chlorine and at a flow rate of 0.3 ml/min./spraying device. The spraying devices are disposed at a spacing of 25 cm in directly opposite relationship, wherein the carrier non-woven fabric material (Micro-Spunbond polypropylene non-woven fabric material weighing 60 g/m$^2$) is passed through at the center at a speed of 0.5 m/min. A high voltage of + and −15 KV respectively is applied to the spraying devices.

The K60 material coated in that way has a deposit rate of 72% of the 0.3–0.5 μm fraction of NACl at a flow speed of 50 l/min with an air resistance of 13 Pa and with an afflux surface area of 100 cm$^2$.

In particular the foregoing examples make it clear that in accordance with the process of the invention it is possible to produce a novel non-woven fabric with hitherto unattained filter properties.

What is claimed is:

1. A process for producing non-woven fabric materials in which nano- and/or microfibers are produced by an electrostatic spinning process from a polymer melt and/or a polymer solution and deposited to form a non-woven fabric, comprising the steps of:

arranging or passing a carrier material in web form through between at least two opposing spraying devices, the spraying devices being connected to a generator for producing an electrical field around nano- and/or microfibers by the electrostatic spinning process;

wherein each side of the carrier material is coated with the nano- and/or microfibers of opposite polarity, which are produced by means of the electrified spraying devices.

2. A process as set forth in claim 1, wherein a throughput rate of the polymer melt and/or polymer solution sprayed by the spraying devices is so increased at least for a part of the spinning operation that at least a part of the polymer melt and/or the polymer solution is deposited in the form of drops on the carrier material.

3. A process as set forth in claim 2, wherein a throughput rate of the polymer melt and/or polymer solution sprayed by the spraying devices is periodically increased and reduced.

4. A process as set forth in one of claims 1, wherein the carrier material in web form is selected from a group consisting of a laid fabric, a knitted fabric, hosiery fabric or a non-woven fabric.

5. A process as set forth in claim 1, wherein the carrier material involves polymer unity in regard to at least one of the polymers used as the polymer melt and/or in the polymer solution.

6. A process as set forth in claim 1, wherein at least one charge-stabilising substance or compound is added to the polymer solution and/or the polymer melt prior to the spinning operation.

7. A process as set forth in claim 6, wherein the charge-stabilising substance or compound is selected from a group consisting of metal powder, carbon and/or graphite powder, dyestuffs, metallocenes, amines, electrically conductive polymers, ceramics and combinations thereof.

8. The process as set forth in claim 6, wherein the at least one charge-stabilising substance or compound is added to the polymer solution and/or the polymer melt prior to the spinning operation in an amount in the range of between 0.001 and 20% by weight.

9. A process as set forth in claim 1, wherein polymer melts and/or polymer solutions which afford polymer unity are fed to the at least two spraying devices.

10. A process as set forth in one of claims 1, wherein different polymer melts and/or polymer solutions are fed to the at least two spraying devices.

11. A process as set forth in claim 1, wherein aqueous solutions selected from a group consisting of polyvinylalcohol, polyvinyl pyrrolidine, polyethylene oxide and copolymers thereof, cellulose derivatives, starch and mixtures of said polymers and/or, dissolved in organic solvents, polystyrene, polycarbonate, polyvinylchloride, polyacrylate, polyurethane, polyamide, polysulfone, polyether sulfone, cellulose derivatives and mixtures of said polymers as a polymer solution and/or thermoplastic materials such as polyolefins, polyesters, polyoxymethylene, polychlorotrifluoromethylene, polyphenylene sulfide, polyaryletherketone, polyvinylidene fluoride as well as mixtures of said polymers are used in a melt for the production of the nano- and/or microfibers.

12. A process as set forth in claim 1, further including the steps of:
    depositing simultaneously two oppositely charged layers of nano- and/or microfibers;
    repeating that operation at least once with respectively identical or different polymer solution and/or polymer melts;
    wherein upon a repetition of the fiber deposit operation the polarity of the electrical field is revered.

13. The process as set forth in claim 1, wherein at least one of the layers of nano- and/or microfibers deposited on the carrier material is provided with a covering comprising a laid fabric, a knitted fabric, hosiery fabric and/or a non-woven fabric.

14. The process as set forth in claim 13, wherein the covering is fixed by lamination, adhesive or needling.

\* \* \* \* \*